(12) United States Patent
Chakra et al.

(10) Patent No.: US 10,614,085 B2
(45) Date of Patent: *Apr. 7, 2020

(54) SYSTEM IMPACT BASED LOGGING WITH ENHANCED EVENT CONTEXT

(71) Applicant: International Business Machines Corporation, Armonk, NY (US)

(72) Inventors: Al Chakra, Apex, NC (US); Jonathan Dunne, Waterford (IE); Liam Harpur, Dublin (IE); Sumit Patel, Round ROck, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/165,186

(22) Filed: May 26, 2016

(65) Prior Publication Data
US 2017/0344413 A1 Nov. 30, 2017

(51) Int. Cl.
| | | |
|---|---|---|
| *G06F 11/00* | (2006.01) | |
| *G06F 16/2458* | (2019.01) | |
| *G06F 11/07* | (2006.01) | |
| *G06F 11/34* | (2006.01) | |
| *G06F 17/40* | (2006.01) | |

(52) U.S. Cl.
CPC ...... *G06F 16/2465* (2019.01); *G06F 11/0766* (2013.01); *G06F 11/3476* (2013.01); *G06F 17/40* (2013.01); *G06F 2201/86* (2013.01)

(58) Field of Classification Search
CPC ............... G06F 11/079; G06F 11/0751; G06F 11/0787; G06F 17/30539; G06F 16/2465; G06F 11/3476; G06F 9/455; G06F 11/3072
See application file for complete search history.

(56) References Cited

U.S. PATENT DOCUMENTS

| | | | |
|---|---|---|---|
| 6,393,386 B1 * | 5/2002 | Zager | .................. H04L 41/0233 370/254 |
| 7,483,810 B2 | 1/2009 | Jackson et al. | |
| 9,152,604 B2 | 10/2015 | Hollender et al. | |

(Continued)

OTHER PUBLICATIONS

CAFC,*Electric Power Group, LLC v. Alstom S.A.*, pp. 1-12 (Year: 2016).*

(Continued)

*Primary Examiner* — Marc Duncan
*Assistant Examiner* — Jonathan D Gibson
(74) *Attorney, Agent, or Firm* — Cantor Colburn LLP; Teddi Maranzano (57) ABSTRACT

Embodiments include method, systems and computer program products for system impact-based event logging. Aspects include receiving, by a processor, one or more log event, wherein each of the one or more log events include an error code and a device identifier; performing a data-mining operation on at least one defect repository based upon the one or more log events and based upon at least one of the device identifier and the error code; deriving one or more enhanced event contexts for at least one of the one or more log events based upon the data-mining operation; and displaying, by a log aggregation tool, the one or more log events and the one or more enhanced event contexts.

16 Claims, 8 Drawing Sheets

(56) References Cited

U.S. PATENT DOCUMENTS

| | | | |
|---|---|---|---|
| 9,239,887 B2 | 1/2016 | Johnston et al. | |
| 10,042,697 B2* | 8/2018 | Ahad | G06F 11/3495 |
| 2002/0022952 A1* | 2/2002 | Zager | H04L 41/0233 |
| | | | 703/22 |
| 2002/0188597 A1* | 12/2002 | Kern | G06Q 10/06 |
| 2006/0107265 A1* | 5/2006 | Schulz | G06Q 10/06 |
| | | | 718/100 |
| 2007/0073519 A1 | 3/2007 | Long | |
| 2009/0070784 A1* | 3/2009 | Schmidt | G06F 11/3495 |
| | | | 719/318 |
| 2011/0276836 A1* | 11/2011 | Kahana | G06F 11/0709 |
| | | | 714/38.1 |
| 2012/0005542 A1* | 1/2012 | Petersen | G06F 11/0709 |
| | | | 714/48 |
| 2012/0011239 A1* | 1/2012 | Svane | G06Q 10/10 |
| | | | 709/223 |
| 2014/0082513 A1 | 3/2014 | Mills et al. | |
| 2014/0157288 A1 | 6/2014 | Wong | |
| 2015/0026335 A1 | 1/2015 | Ladd et al. | |
| 2015/0229532 A1 | 8/2015 | Somaiya et al. | |
| 2016/0004565 A1* | 1/2016 | Harper | G06F 9/4881 |
| | | | 718/102 |
| 2016/0034334 A1 | 2/2016 | Sadovsky et al. | |
| 2016/0092333 A1* | 3/2016 | Liu | G06F 11/3003 |
| | | | 702/186 |
| 2016/0094483 A1* | 3/2016 | Johnston | H04L 47/827 |
| | | | 709/226 |
| 2016/0342453 A1* | 11/2016 | Khan | G06F 11/079 |
| 2016/0350173 A1* | 12/2016 | Ahad | G06F 11/3495 |
| 2016/0352726 A1 | 12/2016 | Hyde et al. | |
| 2017/0083390 A1* | 3/2017 | Talwadker | G06F 11/079 |
| 2017/0091190 A1* | 3/2017 | Attias | G06F 17/30138 |
| 2017/0235628 A1* | 8/2017 | Nguyen | G06F 11/0781 |
| | | | 714/37 |
| 2017/0344413 A1* | 11/2017 | Chakra | G06F 17/30539 |

OTHER PUBLICATIONS

Al Chakra, et al., "System Impact Based Logging With Resource Finding Remediation", U.S. Appl. No. 15/165,200, filed May 26, 2016.

List of IBM Patents or Patent Applications Treated as Related; (Appendix P), Filed Jun. 7, 2016; 2 pages.

Log Management & Log Analysis[online]; [retrieved on Feb. 29, 2016]; retrieved from the Internet https://logrhythm.com/products/log-management/. Andy Lurie, "Uncover Actionable Data", Next-Gen Log Management, 11p.

Nash!Com Communication System[online]; [retrieved on Feb. 29, 2016]; retrieved from the Internet http://www.admincamp.de/konferenz/ac2012.nsf/bc36cf8d512621e0c1256f870073e627/2f98c06caaa29e54c125794a0075b3c9/$FILE/H8-ddm_pdf. Daniel Nashed, Hands-On.

ProfitBricks Blog-Cloud Computing and IaaS Blog[online]; [retrieved on Feb. 29, 2016]; retrieved from the Internet https://blog.profitbricks.com/top-47-log-management-tools . Andy Lurie, "Top 47 Log Management Tools", Cloud computing, May 19, 2014, 43p.

Stackify, [online]; [retrieved on Feb. 29, 2016]; retrieved from the Internet http://stackify.com/wp-content/uploads/2014/09/SmartELM_overview_solutionsheet_final.pdf. "SmartELM—Smart Error & Log Management,", 5p.

* cited by examiner

SYSTEM IMPACT BASED LOGGING WITH ENHANCED EVENT CONTEXT

BACKGROUND

The present disclosure relates to event logging and, more specifically, to methods and systems for system impact-based event logging.

As cloud based systems become more popular with consumers, there is inevitably an increase in the traffic generated by the data centers and in turn the servers and components that each customer consumes. Typically, server side systems record transactions as part of an overall common event logging system, which can be used to track and remedy any errors which may arise. When these errors or warning events are generated, they are placed within a log file, which means these systems can be difficult to debug due to many factors including clustered server types and ambiguous server side messages. This becomes a problem for enterprises, especially as more complex and remote services are utilized since event logging is typically the way by which system troubleshooting can begin. Additionally, as more enterprises adopt multi-vendor infrastructures, multiple messages and error codes could be generated with the possibility of duplicates codes.

While text tags can be applied to a log event, they typically do not give a full picture as to what the potential impact is to the end user or the administrator. The log events also do not give a full picture of what behavior or effect is required by the end user or administrator to respond to such an event. This means that separate message repositories or support processes are created simply to track and understand the initial log event. This creates layers of complication which prevent systems from being restored.

SUMMARY

Embodiments include a computer system for system impact-based event logging, the computer system having a process, the processor configured to perform a method. The method includes receiving, by a processor, one or more log event, wherein each of the one or more log events include an error code and a device identifier; performing a data-mining operation on at least one defect repository based upon the one or more log events and based upon at least one of the device identifier and the error code; deriving one or more enhanced event contexts for at least one of the one or more log events based upon the data-mining operation; and displaying, by a log aggregation tool, the one or more log events and the one or more enhanced event contexts.

Embodiments also include a computer program product for system impact-based event logging, the computer program product including a non-transitory computer readable storage medium having computer readable program code embodied therewith. The computer readable program code including computer readable program code configured to perform a method. The method includes receiving, by a processor, one or more log event, wherein each of the one or more log events include an error code and a device identifier; performing a data-mining operation on at least one defect repository based upon the one or more log events and based upon at least one of the device identifier and the error code; deriving one or more enhanced event contexts for at least one of the one or more log events based upon the data-mining operation; and displaying, by a log aggregation tool, the one or more log events and the one or more enhanced event contexts.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION

In accordance with exemplary embodiments of the disclosure, methods, systems and computer program products for system impact-based event logging are provided. In one or more exemplary embodiments, methods for system impact-based event logging include receiving log events of a computer network and deriving an enhanced event context of the log event. The enhanced event context is derived by data mining a defect repository or database with information from an equipment manufacturer or an online community that has knowledge of common defects. The enhanced event context relates to the impact a log event will have on the computer network. In one or more embodiments, the enhanced event context will work to resolve the log event by identifying resources to address the log event. These resources can be individuals within an organization or company that have specific knowledge of how to address the log event. This resolution process can take the form of scheduling an interactive communication session with these resources based on the severity of the log event as derived from the enhanced event context.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
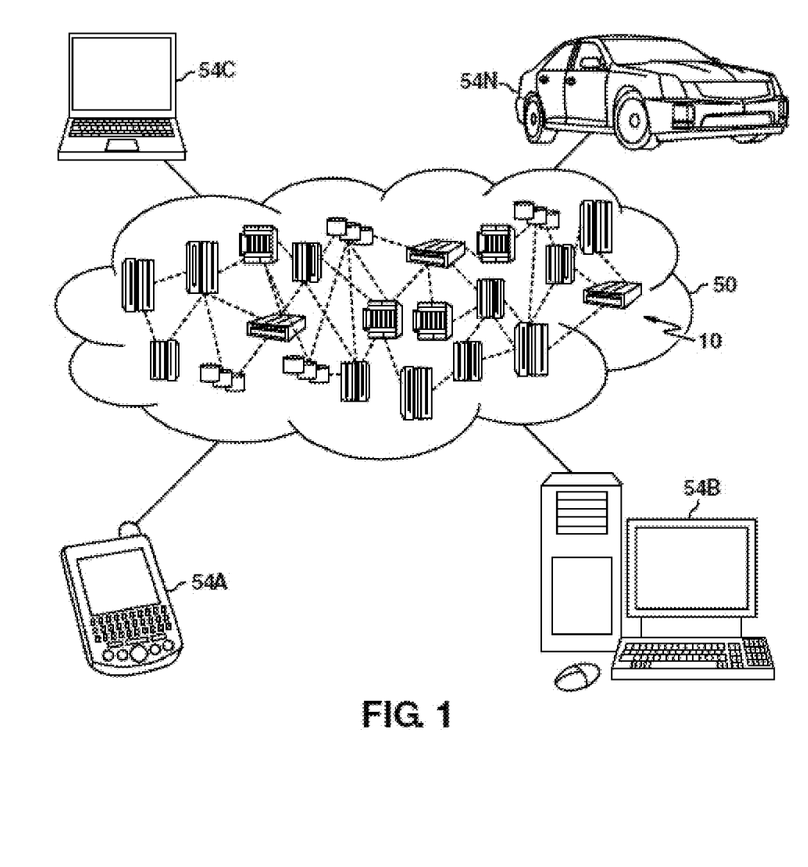
FIG. 1 depicts a cloud computing environment according to one or more embodiments of the present invention.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
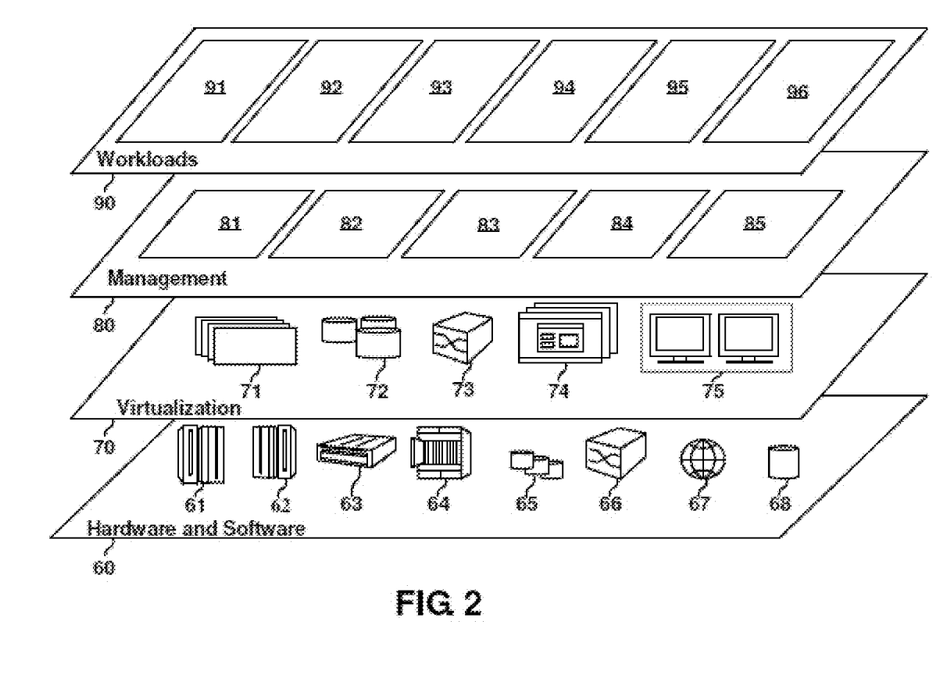
FIG. 2 depicts abstraction model layers according to one or more embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; system impact-based logging with enhanced event context 95; and system impact-based logging with resource finder remediation 96.

Figure 3:
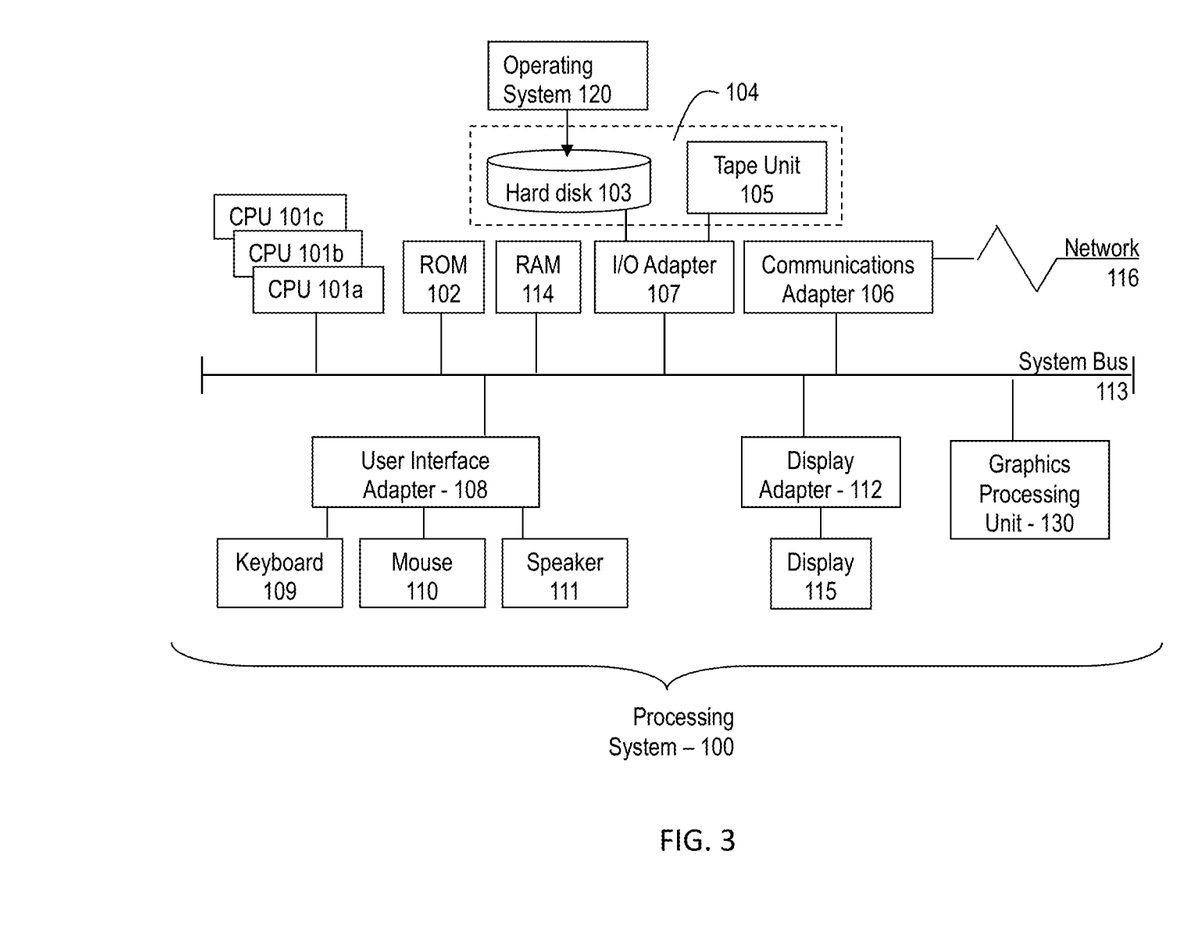
FIG. 3 illustrates a block diagram of a computer system for use in practicing the teachings herein.

Referring to FIG. 3, there is shown an embodiment of a processing system 100 for implementing the teachings herein. In this embodiment, the system 100 has one or more central processing units (processors) 101a, 101b, 101c, etc. (collectively or generically referred to as processor(s) 101). In one or more embodiments, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of system 100.

FIG. 3 further depicts an input/output (I/O) adapter 107 and a network adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. Operating system 120 for execution on the processing system 100 may be stored in mass storage 104. A network adapter 106 interconnects bus 113 with an outside network 116 enabling data processing system 100 to communicate with other such systems. A screen (e.g., a display monitor) 115 is connected to system bus 113 by display adaptor 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

In exemplary embodiments, the processing system 100 includes a graphics processing unit 130. Graphics processing unit 130 is a specialized electronic circuit designed to manipulate and alter memory to accelerate the creation of images in a frame buffer intended for output to a display. In general, graphics processing unit 130 is very efficient at manipulating computer graphics and image processing and has a highly parallel structure that makes it more effective than general-purpose CPUs for algorithms where processing of large blocks of data is done in parallel.

Thus, as configured in FIG. 3, the system 100 includes processing capability in the form of processors 101, storage capability including system memory 114 and mass storage 104, input means such as keyboard 109 and mouse 110, and output capability including speaker 111 and display 115. In one embodiment, a portion of system memory 114 and mass storage 104 collectively store an operating system coordinate the functions of the various components shown in FIG. 3.

Figure 4:
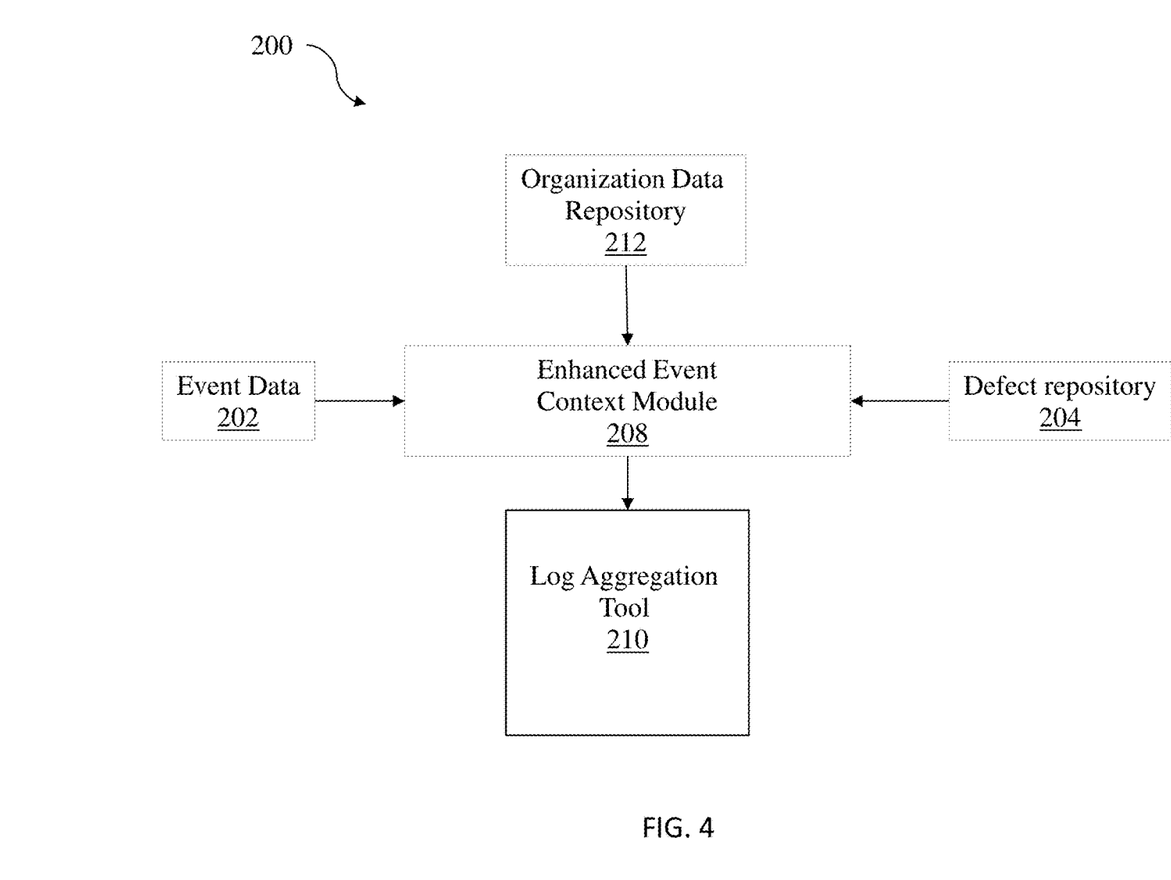
FIG. 4 illustrates a block diagram of a system for system impact-based event logging in accordance with one or more embodiments.

FIG. 4 illustrates a block diagram of a system 200 for system impact-based event logging according to one or more embodiments. In the illustrative embodiment, the system 200 includes event data 202, a defect repository 204, an enhanced event context module 208, a log aggregation tool 210, and organization data repository 212.

In one or more embodiments, the event data 202 includes log events, errors, and warnings related to server side systems record transactions. The event data 202 is analyzed by the enhanced event context module 208. Based upon the event data 202, the enhanced event context module 208 data mines the defect repository 204 to identify the event code associated with the event data 202. In one or more embodiments, after the defect repository 204 has been data mined, the enhanced event context module 208 performs a data analysis and a statistical analysis to derive an enhanced event context (EEC). The log aggregation tool 210 then displays the enhanced event context along with the log events, errors, and warnings.

In one or more embodiments, the enhanced event context includes the log event and event code along with information describing the potential and real impact to an end user or administrator of a network system. This impact information found in the enhanced event context is derived from the data mining operation on the defect repository 204. The defect repository 204 is a database containing defect data about different hardware and software products found within a network system. This defect data can be company specific for defects that are known to occur with a released hardware or software product. In one or more embodiments, the defect repository can be a database containing defect information taken from an original equipment manufacturer, a local system administrator, or a network community.

In an embodiment, the defect data includes a title of the defect, a severity rating of the defect, a device identifier, an error code, the name or type of component that the defect is found and a summary description of the defect and possible resolutions. For example, when a log event occurs, an error code and device identifier can be sent to the enhanced event context module 208. Based upon this code and identifier, the defect repository 204 is data mined to derive an enhanced event context.

In one or more embodiments, the enhanced event context includes information about event codes that indicate a larger issue within the system but may not register as an issue based upon the event code. For example, a user of a network system may attempt to login but inputs invalid credentials. An event code is created indicating the user's attempt to login with invalid credentials. An administrator reviewing this event code may view it as a typographical error on the user side login and dismiss the error code as not critical to system integrity. However, if a user attempts to login with invalid credentials five hundred times within twenty seconds, the enhanced event context would indicate the larger issue may be a potential hacking threat to the system.

In one or more embodiments, the enhanced event context includes information about the event log and event code and a description of the potential or real impact on the system. The enhanced event context module 208 uses this information to data mine organization data 212 of an organization or company to identify the party or parties who can aid the remediation of a log event. The party or parties may be subject matter experts within the organization who may be able to remediate the log event faster than the system administrator or user of the system 200. In an embodiment, organization data 212 can include data related to the operation of the organization such as scheduled meetings and product launches. This organization data 212 will add to the enhanced event context by adding a business impact context to the log event.

In one or more embodiments, the log aggregation tool 210 can display the enhanced event context utilizing visual and sound alerts to highlight the impact of a log event. For example, for log events with blocking and critical issues within a system, the visual alert could have a red theme with sound alerts. For major issues within a system, the visual alert could have an orange theme. For normal and minor impact events within a system, the visual alert could have a green theme. These visual and sound alerts can be user defined and can be integrated with existing escalation processes allowing for quicker resolution times.

In one or more embodiments, the enhanced event context module 208 performs a data analysis and statistical analysis to derive an enhanced event context. The statistical analysis can be a regression analysis. For example, a statistical analysis looks at the defect repository 204 and the log events contained within a log event file. Using statistical methods, including but not limited to a linear regression or a binary regression, the system 200 derives the enhanced event context. To derive the enhanced event context, the system 200 analyzes the log event data, any defect data, and severity of the defect data. The system 200 then determines the association or regression effect between the log event and a known or likely severity based upon information derived from the defect repository. Based upon the association, the system derives an enhanced event context for the log event.

Figure 5:
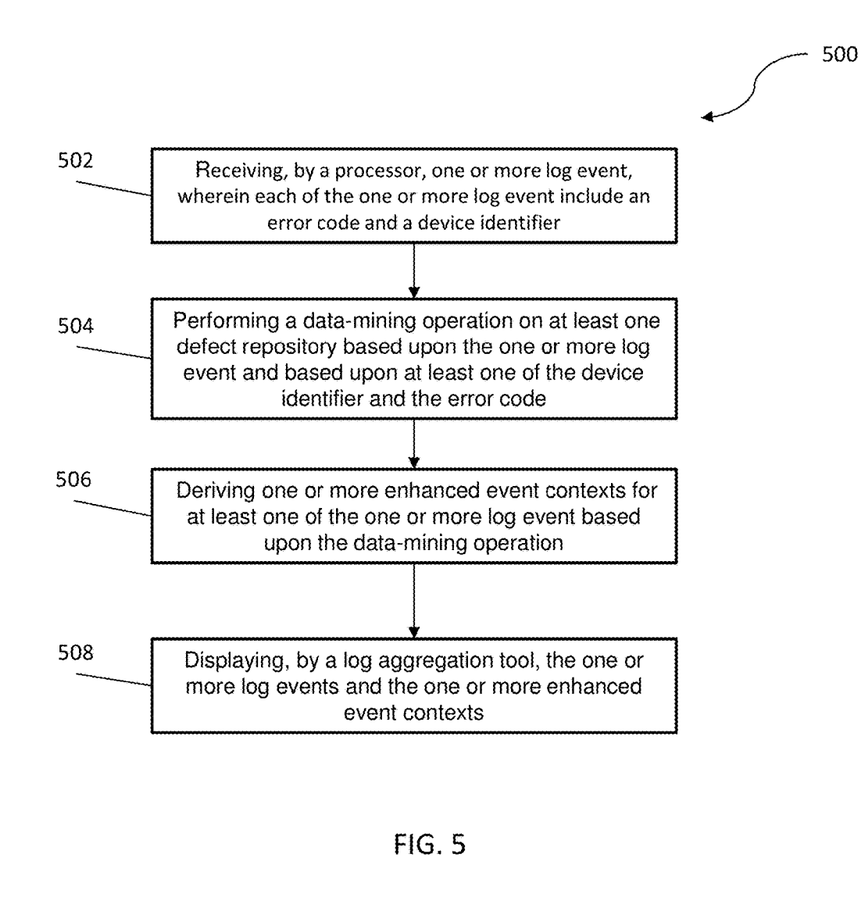
FIG. 5 illustrates a flow diagram of a method for system impact-based event logging with enhanced event context in accordance with one or more embodiments.

FIG. 5 illustrates a block diagram of a method 500 for system impact-based logging with enhanced event context according to one or more embodiments. The method 500 includes receiving, by a processor, one or more log event, wherein each of the one or more log events include an error code and a device identifier, as shown at block 502. The method 500 also includes, at block 504, performing a data-mining operation on at least one defect repository based upon the one or more log event and based upon at least one of the device identifier and the error code. Next, at block 506, the method 500 includes deriving one or more enhanced event contexts for at least one of the one or more log event based upon the data-mining operation. At block 508, the method 500 includes displaying, by a log aggregation tool, the one or more log events, and the one or more enhanced event contexts.

Additional processes may also be included. It should be understood that the processes depicted in FIG. 5 represent illustrations, and that other processes may be added or existing processes may be removed, modified, or rearranged without departing from the scope and spirit of the present disclosure.

Figure 6:
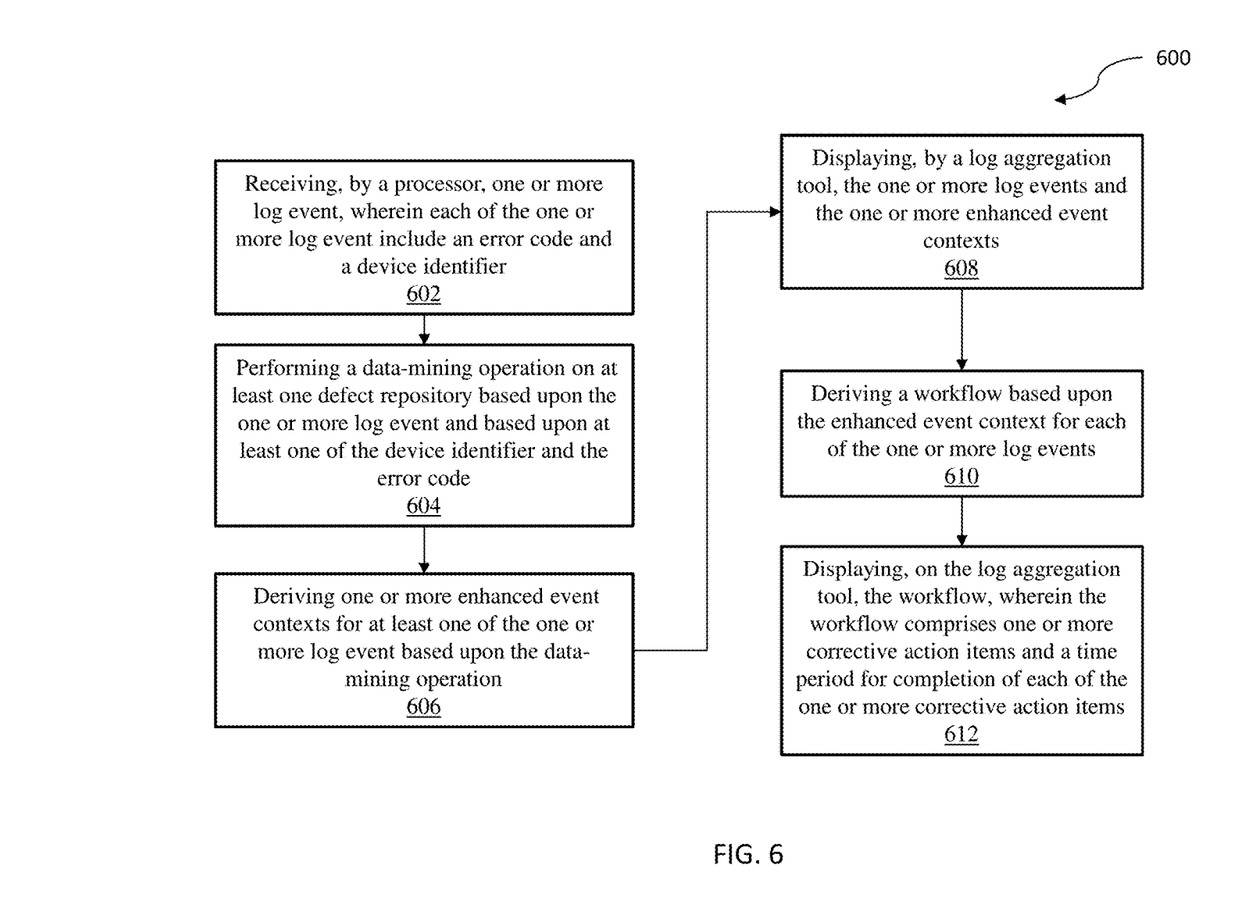
FIG. 6 illustrates a flow diagram of a method for system impact-based event logging with resource finding remediation in accordance with one or more embodiments.

FIG. 6 illustrates a block diagram of a method 600 for system impact-based logging with resource finding remediation according to one or more embodiments. The method 600 includes receiving, by a processor, one or more log event, wherein each of the one or more log events include an error code and a device identifier, as shown at block 602. The method 600 also includes, at block 604, performing a data-mining operation on at least one defect repository based upon the one or more log event and based upon at least one of the device identifier and the error code. Next, at block 606, the method 600 includes deriving one or more enhanced event contexts for at least one of the one or more log event based upon the data-mining operation. At block 608, the method 600 includes displaying, by a log aggregation tool, the one or more log events, and the one or more enhanced event contexts. Next, at block 610, the method 600 includes deriving a workflow based upon the enhanced event context for each of the one or more log events. At block 612, the method 600 includes displaying, on the log aggregation tool, the workflow, wherein the workflow comprises one or more corrective action items and a time period for completion of each of the one or more corrective action items Additional processes may also be included. It should be understood that the processes depicted in FIG. 6 represent illustrations, and that other processes may be added or existing processes may be removed, modified, or rearranged without departing from the scope and spirit of the present disclosure.

Figure 7:
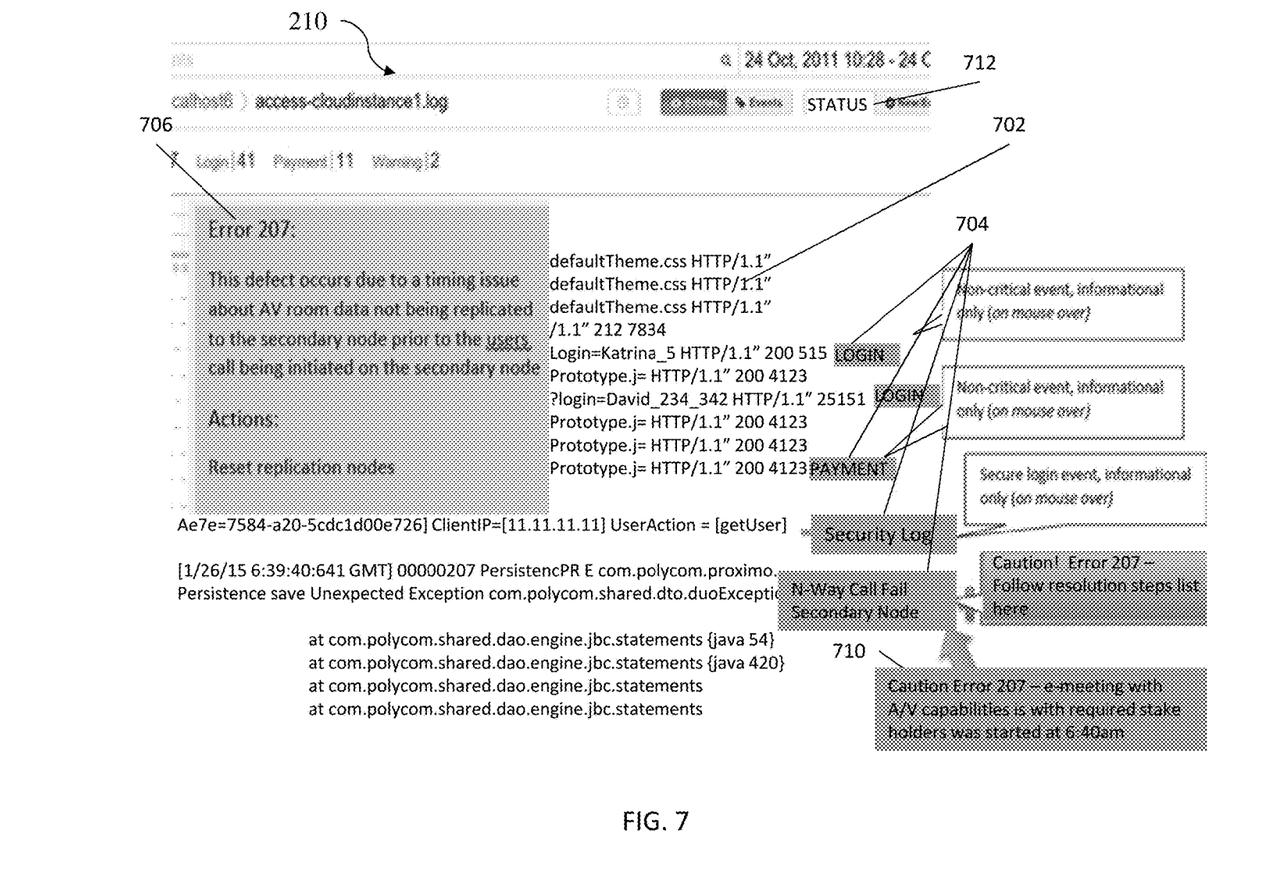
FIG. 7 illustrates a log aggregation tool in accordance with one or more embodiments.

FIG. 7 illustrates a log aggregation tool 210 according to one or more embodiments. The log aggregation tool 210 includes log events 702 with associated event codes displayed for a user, such as a system administrator. The one or more of the log events 702 include one or more indicia 704. In one or more embodiment, the indicia 704 can include a color coded tag or icon. The indicia 704 indicate additional context available to the user when present with the log event 702. For example, indicia with the text "Security Log" may contain informational context only regarding a secure login event. As illustrated, the indicium with the text "N-Way Call Fail Secondary Node" indicates a cautionary warning alerting the user of a log event 702 that needs attention. When the user selects the indicia 704 indicating the N-Way Call Fail, an enhanced event context 706 is displayed. As shown in the illustrated embodiment, the enhanced event context display 706 relates to an n-way call fail. The enhanced event context 706 includes the log event error code, a description of the log event, and a workflow. In other embodiments, the enhanced event context 706 can include the log event, error code, a severity level, and a device identifier if the log event is related to a specific component failure. In the illustrated embodiment, the workflow includes a corrective action item suggesting to the user of the log aggregation tool 210 to reset the replication nodes. In one or more embodiments, the workflow can include a video training module, an audio training module, or a text training module. The workflow can be interactive with the user such as a presentation where the user can input any additional information, if needed, to derive or enhance the action plan.

In one or more embodiments, the workflow contains one or more corrective action items and a time period for completion of the one or more corrective action items. A severity level may be included in the workflow and related to each of the corrective action items. The time period for completion can be tied to the severity level. The severity level can be derived from the log event 702 or the enhanced event context 706.

In one or more embodiments, the log aggregation tool 210 can include a status indicator 712 that can mark a log event 702 as resolved, in-process, delayed, dismissed, and the like to indicate a status of the resolution of the log event 702 and the one or more corrective action items. The status indicator 712 can include a progress indicator showing the progress of the corrective action item. For example, a user may indicate that they have completed 70% of the corrective action item and can indicate that with the status indicator 712.

In one or more embodiments, the enhanced event context 706 can include a system impact, an end-user impact, and a business impact of the log event. Additionally, the enhanced event context 706 can include technically related data as well as non-technically related data. In the illustrated embodiment, non-technically related data 710 is displayed describing the call fail in the context of impact on business operations. The business impact of the call fail is the delay of an e-meeting with audio visual capabilities between required stake holders for a meeting beginning at 6:40 am. The technical and non-technical data combined within the log aggregation tool 210 allows a user to understand log events impact from more than one perspective, such as business operational impact.

In an embodiment, the indicia 704 may display informational data on the log event if the user positions the mouse cursor over the log. On mouse over, an additional display box may appear containing information on the log event. In the illustrated embodiment, a mouse over of the "LOGIN" indicia opens the text box stating, "Non-critical event, information only." Additional display options, such as, for example, a mouse click or key stroke from a keyboard can be used to display the text box containing the additional information.

Figure 8:
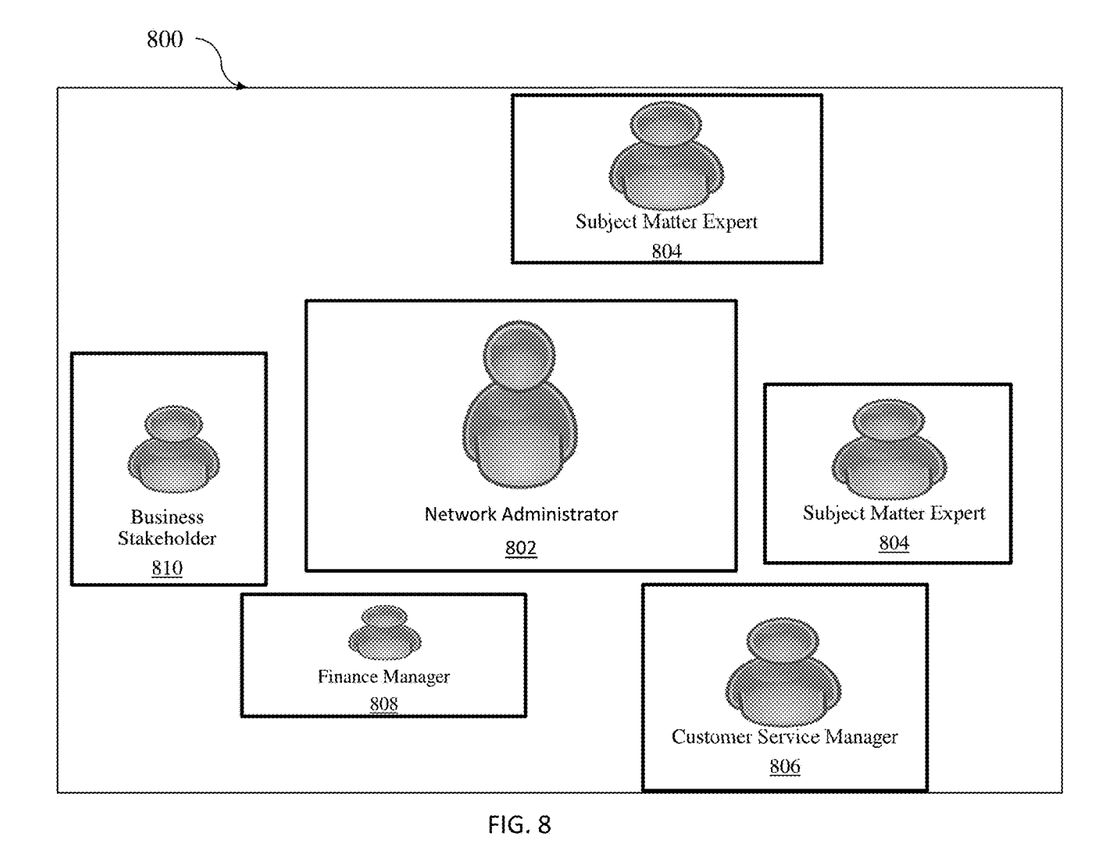
FIG. 8 illustrates an interactive communication session in accordance with one or more embodiments.

FIG. 8 illustrates an interactive communication session 800 according to one or more embodiments. The interactive communication session 800 can be displayed on one or more screens, such as a computer screen or a smart phone or tablet screen. In the illustrated embodiment, the interactive communication session 800 is a computer screen bringing multiple video feeds to different individuals within a company or organization. The different individuals to address the log event are identified after a data mining operation is performed on the organization data repository 212. In the illustrated embodiment, the group of individuals identified includes a network administrator 802, a subject matter expert 804, a customer service manager 806, a finance manager 808, and a business stakeholder 810. An example log event can be an issue with a company website related to the checkout/purchase feature of a web site. This type of log event would have an impact on the business and customer service which would require the business stakeholder 810 and the customer service manager 806. Additionally, subject matter experts 804 and the network administrator would be looped in to establish a resolution and timeline to communicate to the customer service manager 806 and the business stakeholder 810. A finance manager 808 can be included to discuss any financial impact of the log event or any procurement questions that may need to be discussed while developing a resolution.

In one or more embodiments, based upon the severity of the log event, the interactive communication session 800 can bring together all the responsible parties immediately. For example, a critical issue can pop up a video feed for all parties on their computer screen at their workstation. Or if working remotely, may pop up a video feed on a party's smartphone or tablet so they can immediately participate in the interactive communication session. Less severe issues can result in a scheduled interactive communication session or meeting to address the issue. In one or more embodiments, an interactive communication session 800 can be an online messenger application or an in-person meeting.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting-data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for logging events in a computer system, the method comprising:
   receiving, by a processor, one or more log events, wherein each of the one or more log events include an event code and a device identifier;
   receiving, by the processor, business data related to an organization;
   performing a data-mining operation on at least one defect repository based upon the one or more log events, the business data, and at least one of the device identifier and the event code, wherein the business data comprises non-technical data associated with operations of the organization that are affected by the one or more log events;
   deriving a business impact for the organization based on the data-mining operation;
   deriving one or more enhanced event contexts for at least one of the one or more log events based upon the data-mining operation, wherein the one or more enhanced event contexts comprise the business impact for the organization;
   wherein the business impact for the organization comprises an operational impact for the organization;
   displaying, by a log aggregation tool, the one or more log events, the one or more enhanced event contexts, a status indicator for the one or more log events;
   deriving a workflow based at least in part on the one or more enhanced event contexts wherein the workflow comprises a severity level based upon the log event, wherein the severity level is derived based on a regression effect between the one or more log events and a likely severity derived from the at least one defect repository;
   performing a data-mining operation on one or more databases, wherein the one or more databases comprise a company hierarchical structure;
   identifying a user having subject matter expertise related to the one or more enhanced event contexts based on the data-mining operation; and
   initiating, by the processor, the workflow for the user by scheduling an interactive communication session with the user and one or more responsible parties based upon the severity level, wherein the one or more responsible parties are associated with the business impact for the organization.

2. The method of claim 1, wherein the enhanced event context comprises:
   a system impact of the log event and an end-user impact of the log event.

3. The method of claim 1, wherein the status indicator comprises at least one of a resolved, in-process, and dismissed.

4. The method of claim 1, wherein the status indicator is provided by a user of the log aggregation tool.

5. The method of claim 1, wherein the data-mining operation is a regression analysis.

6. The method of claim 1, wherein the at least on defect repository is a database containing event code information taken from at least one of an original equipment manufacturer, a local system administrator, and a network community.

7. The method of claim 1, wherein the log aggregation tool includes a display alert based upon the severity of the log event.

8. The method of claim 7, wherein the display alert includes an audio and visual alert.

9. A system for system impact-based event logging, the system comprising:
   a memory; and
   a processor communicatively coupled to the memory, wherein the processor is configured to:
   receive, by a processor, one or more log event, wherein each of the one or more log event include an event code and a device identifier;
   receive business data related to an organization;
   perform a data-mining operation on at least one defect repository based upon the one or more log event, the business data, and at least one of the device identifier and the event code, wherein the business data comprises non-technical data associated with operations of the organization that are affected by the one or more log events;
   derive a business impact for the organization based on the data-mining operation;

derive one or more enhanced event contexts for at least one of the one or more log event based upon the data-mining operation, wherein the one or more enhanced event contexts comprise the business impact for the organization;

wherein the business impact for the organization comprises an operational impact for the organization;

display, on a log aggregation tool, the one or more log events, the one or more enhanced event contexts, a status indicator for the one or more log events;

deriving a workflow based at least in part on the one or more enhanced event contexts, wherein the workflow comprises a severity level based upon the log event, wherein the severity level is derived based on a regression effect between the one or more log events and a likely severity derived from the at least one defect repository;

performing a data-mining operation on one or more databases, wherein the one or more databases comprise a company hierarchical structure;

identifying a user having subject matter expertise related to the one or more enhanced event contexts based on the data-mining operation;

initiating, by the processor, the workflow for the user by scheduling an interactive communication session with the user and one or more responsible parties based upon the severity level, wherein the one or more responsible parties are associated with the business impact for the organization.

10. The system of claim 9, wherein the enhanced event context comprises:
a system impact of the log event and an end-user impact of the log event.

11. The system of claim 9, wherein the status indicator comprises at least one of a resolved, in-process, and dismissed.

12. The system of claim 9, wherein the status indicator is provided by a user of the log aggregation tool.

13. The system of claim 9, wherein the at least on defect repository is a database containing event code information taken from at least one of an original equipment manufacturer, a local system administrator, and a network community.

14. A computer program product for logging events in a computer system, the computer program product comprising a computer readable storage medium having program instructions embodied therewith, wherein the computer readable storage medium is not a transitory signal per se, the program instructions executable by a processor to cause the processor to perform a method comprising:

receiving, by a processor, one or more log event, wherein each of the one or more log events include an event code and a device identifier;

receiving, by the processor, business data related to an organization;

performing a data-mining operation on at least one defect repository based upon the one or more log event, the business data, and at least one of the device identifier and the event code, wherein the business data comprises non-technical data associated with operations of the organization that are affected by the one or more log events;

deriving a business impact for the organization based on the data-mining operation;

deriving one or more enhanced event contexts for at least one of the one or more log event based upon the data-mining operation, wherein the one or more enhanced event contexts comprise the business impact for the organization;

wherein the business impact for the organization comprises an operational impact for the organization;

displaying, by a log aggregation tool, the one or more log events, the one or more enhanced event contexts, a status indicator for the one or more log events;

deriving a workflow based at least in part on the one or more enhanced event contexts, wherein the workflow comprises a severity level based upon the log event, wherein the severity level is derived based on a regression effect between the one or more log events and a likely severity derived from the at least one defect repository;

performing a data-mining operation on one or more databases, wherein the one or more databases comprise a company hierarchical structure;

identifying a user having subject matter expertise related to the one or more enhanced event contexts based on the data-mining operation;

initiating, by the processor, the workflow for the user by scheduling an interactive communication session with the user and one or more responsible parties based upon the severity level, wherein the one or more responsible parties are associated with the business impact for the organization.

15. The computer program product of claim 14, wherein the enhanced event context comprises:
a system impact of the log event and an end-user impact of the log event.

16. The computer program product of claim 14, wherein the at least on defect repository is a database containing event code information taken from at least one of an original equipment manufacturer, a local system administrator, and a network community.

* * * * *